United States Patent [19]

Hartman

[11] Patent Number: 4,662,813
[45] Date of Patent: May 5, 1987

[54] MECHANISM FOR ROTATING A ROBOT ARM ON AN AXIS

[76] Inventor: John F. Hartman, Box 50, Gardiner Rd., Apalachin, N.Y. 13732

[21] Appl. No.: 737,494

[22] Filed: May 24, 1985

[51] Int. Cl.⁴ .............................................. B66C 1/10
[52] U.S. Cl. .................................. 414/718; 74/89.22; 414/753; 901/18; 901/22
[58] Field of Search ............... 414/718, 730, 735, 749, 414/753; 901/13, 19, 21, 22, 23, 25, 27, 18; 74/108, 89.22, 89.21, 89.2

[56] References Cited

U.S. PATENT DOCUMENTS

| | | | |
|---|---|---|---|
| 2,763,950 | 9/1956 | Dieterman et al. | 74/89.21 X |
| 3,303,941 | 2/1967 | Hanes | 414/753 |
| 3,451,669 | 6/1969 | Swezey | 74/89.21 X |
| 3,734,303 | 5/1973 | Blatt | 414/753 |
| 3,777,902 | 12/1973 | Potter | 901/22 X |
| 3,809,257 | 5/1974 | Klancnik | 414/751 X |
| 3,830,382 | 8/1974 | Nagamori | 414/753 X |
| 3,851,769 | 12/1974 | Noguchi et al. | 901/22 X |
| 3,859,862 | 1/1975 | Brems | 74/89.21 X |
| 3,885,678 | 5/1975 | Borg et al. | 414/752 |
| 3,954,188 | 5/1976 | Boyle | 901/22 X |
| 4,005,782 | 2/1977 | Crockett | 414/753 X |
| 4,187,051 | 2/1980 | Kirsch et al. | 901/22 X |

Primary Examiner—Joseph E. Valenza
Assistant Examiner—Lyle Kimms
Attorney, Agent, or Firm—Shlesinger, Arkwright, Garvey & Fado

[57] ABSTRACT

A rotary mechanism for robot manipulators and the like has a housing and a shaft moveably disposed in the housing so that an end portion thereof is movable toward and away from the housing. A cylinder and piston assembly is connected to the shaft for moving the shaft. A robot manipulator is connected to the end portion and a mechanism for operating the manipulator is also carried there. A support is connected to the shaft and is carried therewith and is disposed at a distance from the end portion. A chain drive system is operatively associated with the shaft for rotating the shaft on the longitudinal axis thereof. A pair of braces are disposed in the housing and are engaged with the support for preventing rotation of the support during operation of the chain drive mechanism.

24 Claims, 6 Drawing Figures

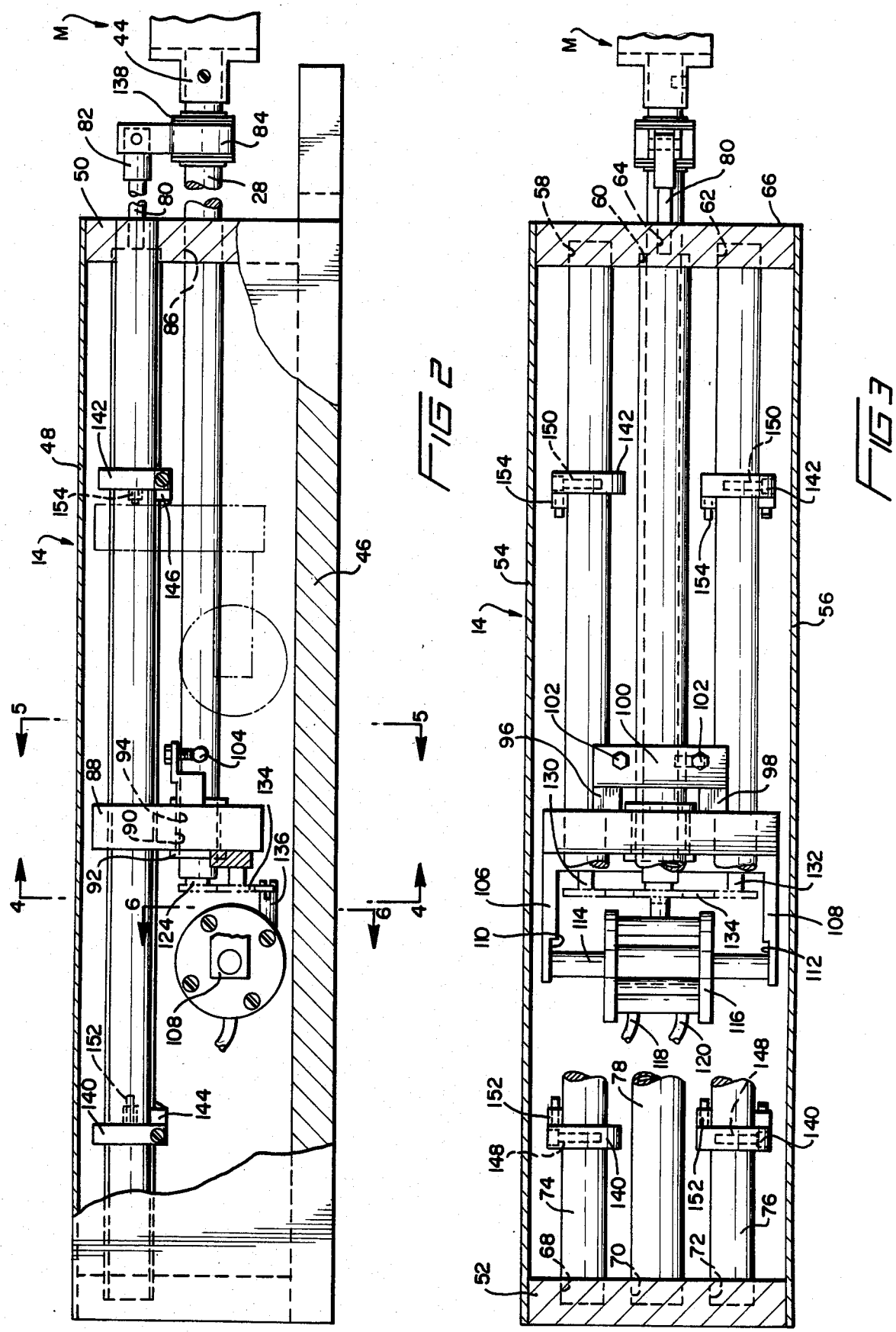

4,662,813

MECHANISM FOR ROTATING A ROBOT ARM ON AN AXIS

BACKGROUND OF THE INVENTION

Automation of manufacturing facilities has been occurring at a rapid rate in the recent past. Robots have been an integral part of this automation effort because of the flexibility provided. Robots have not been utilized, however, by small manufacturers because of the relatively high costs involved and the extreme complexity of the robots. Consequently, there has arisen a need for a relatively low cost robot which is of comparatively simple design.

An essential element of almost any robot is the ability of the manipulator-carrying shaft to rotate on an axis. Generally, the rotary mechanism has been carried by or is proximate the end of the shaft carrying the manipulator. Furthermore, the rotary mechanisms have been relatively complicated. Such complicated mechanisms are not well suited for small manufacturers because of the need for skilled craftsmen of several disciplines.

Inaba, et al, U.S. Pat. No. 4,352,620, discloses an industrial robot having two rotative mechanisms for rotating two arms relative to the axial directions thereof. The device disclosed in Inaba, et al, is a relatively complicated mechanism not particularly suited for small manufacturers. Furthermore, Inaba, et al, discloses a complicated structure requiring the proper working of numerous parts, which therefore leads to an increased possibility of breakdown.

Inaba, et al, U.S. Pat. No. 4,274,802, discloses an automated device wherein a rotary actuator is drivingly engaged with the manipulator for causing rotation thereof. The rotary mechanism is disposed proximate the manipulator and is movable on the shaft thereof. A pin mechanism is used to stop rotation and, preferably, includes a cushion. One drawback with this device is the carrying of the rotary mechanism at the distal end of the shaft which therefore generates a torque on the shaft and its supporting structure.

From the above, it can be seen that there is a need for a relatively simple rotary mechanism for a robot arm. The rotary mechanism should not be mounted to the shaft proximate the manipulator in order to not decrease the load-carrying capability of the manipulator by the increased torque generated. Furthermore, the rotary mechanism should be of simple design in order to minimize maintenance and lessen the possibility of breakd and to also decrease the costs.

OBJECTS AND SUMMARY OF THE INVENTION

The primary object of the disclosed invention is to provide a rotary mechanism for a robot arm which is of relatively simple construction and which is carried by the arm but at a substantial distance from the manipulator in order to increase the load-carrying capability.

A further of object of the disclosed invention is to provide a chain drive system for rotating the shaft which carries the manipulator.

Yet another object of the disclosed invention is to provide a cylinder and piston assembly for moving the manipulator-carrying shaft inwardly and outwardly relative to the housing.

Yet a further object of the disclosed invention is to provide a plurality of spaced parallel braces which cooperate with the rotary mechanism in order to permit rotation of the shaft without causing rotation of the rotary mechanism.

Still another object of the disclosed invention is to provide an air-powered cylinder and piston assembly which cooperates with the chain drive mechanism for causing rotation of the shaft in response to lateral displacement of the cylinder.

Still another object of the disclosed invention is to provide forward and rearward stops on the braces in order to prevent displacement of the shaft beyond predetermined points.

Yet a further object is to provide a compact rotary mechanism permitting the arm housing to be of relatively small size.

Still a further object is to utilize the rotary mechanism as a counterweight as a means for minimizing torque and for increasing the capacity of the robot.

In summary, the disclosed invention is a unique air-powered chain-drive mechanism for rotating the manipulator-carrying shaft of a robot. The rotary mechanism is carried by the shaft and is mounted proximate the dorsal end of the shaft in order to increase the load-carrying capability of the robot while avoiding the generation of excess torque.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 2 is a fragmentary side elevational view thereof with portions broken away;

FIG. 3 is a fragmentary top plan view thereof with portions broken away;

DESCRIPTION OF THE INVENTION

Figure 1:
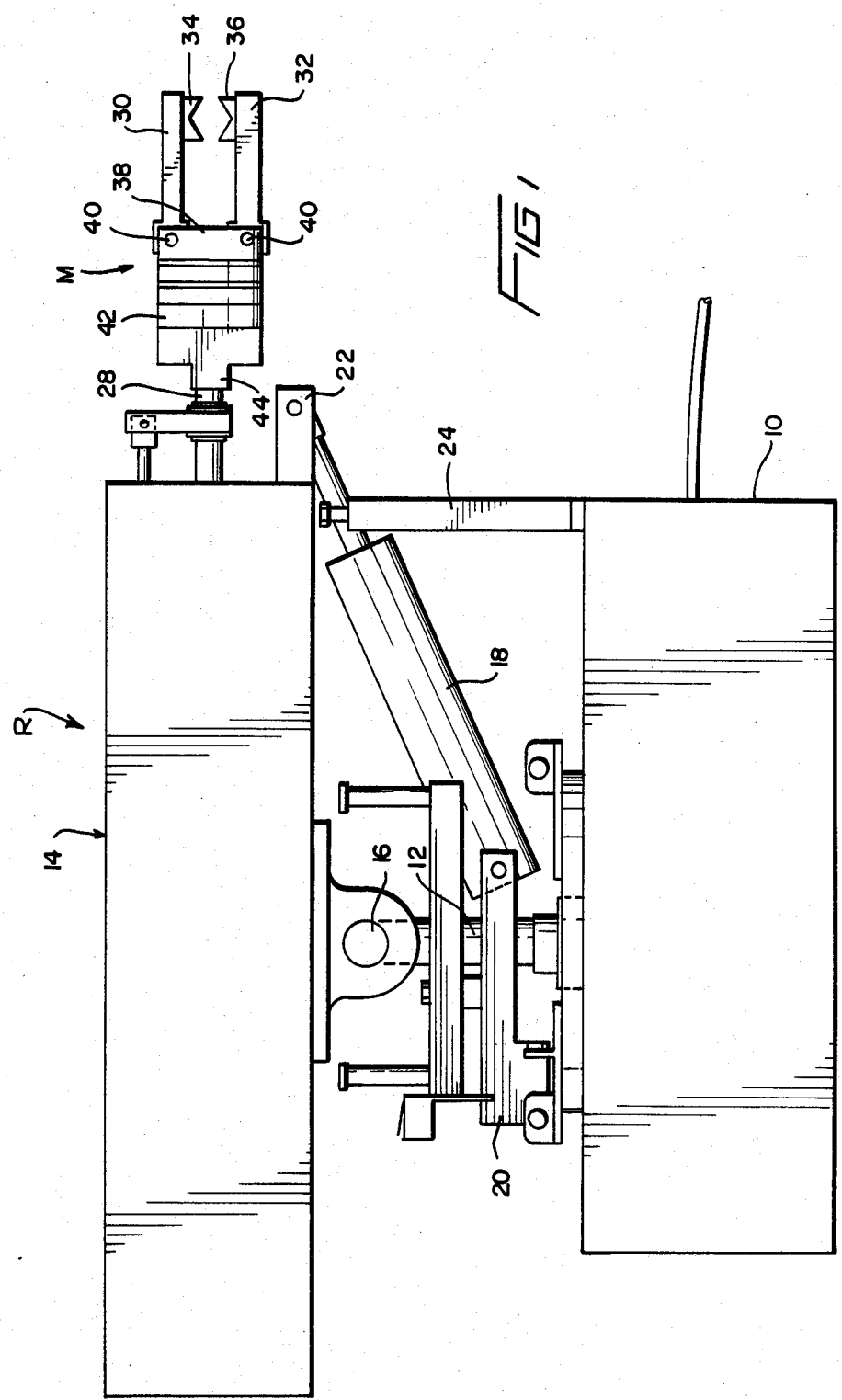
FIG. 1 is a side elevational view of the robot of the invention.

Robot R, as best shown in FIG. 1, generally comprises a base 10, a shaft 12 extending upwardly therefrom and being rotatable on the longitudinal axis thereof, and an arm 14 pivotally mounted at the distal end of shaft 12 by pivot mechanism 16. Air-powered cylinder and piston assembly 18 is pivotally connected to shaft 12 through table 20 and to arm 14 by bracket 22. Those skilled in the art will appreciate that displacement of the piston of the cylinder and piston assembly 18 will cause pivoting of the arm 14 about the pivot axis of pivot mechanism 16. The means for rotating the shaft 12 on the longitudinal axis thereof are likewise air-powered, although not shown, and are conventional and are, preferably, contained in base or housing 10. Preferably, rests 24 are mounted to base 10 at either end thereof in order to control the pivoting of the arm 14 about the pivot axis of mechanism 16.

Manipulator M is carried at the distal end of shaft 28 extending from arm 14. The shaft 28 is movable inwardly and outwardly relative to arm 14, as will be further explained, so that the manipulator M may be positioned appropriately for performing a given task. The manipulator M includes arms 30 and 32 carrying jaws 34 and 36, respectively, and being pivotally mounted to link 38 by means of pins 40. Collar 42 is connected to link 38 and coupling 44 is connected to shaft 28. Collar 42 includes cylinder and piston actuation means for causing pivoting of the arms 30 and 32.

Arm 14, as best shown in FIGS. 2 and 3, includes base 46 and spaced parallel cover 48. Endwalls 50 and 52 extend therebetween and between sidewalls 54 and 56. In this way, the arm 14 provides a dust-free housing for receipt of the components of the rotating mechanism, as will be further explained.

As best shown in FIG. 3, endwall 50 includes cylindrical recesses 58, 60 and 62, disposed in spaced parallel relation. Aperture 64 is coaxial with recess 60, for reasons to be explained herein, and extends through the outer surface 66 of endwall 50. Corresponding recesses 68, 70 and 72 are disposed in spaced parallel relation in endwall 52 and are coaxially aligned with recesses 58, 60 and 62, repectively. Tubular brace 74 is received in recesses 58 and 68 and extends therebetween. A similar solid brace 76 is received in recesses 62 and 72. Cylinder 78 is received in recesses 60 and 70 and extends therebetween and piston 80 extends outwardly through aperture 64.

As best shown in FIG. 2, piston 80 is connected by arm 82 to collar 84 which is secured to shaft 28. Collar 84 is disposed proximate coupling 44 and includes bearing assemblies to permit rotation of shaft 28. Endwall 50 has an aperture 86 parallel to aperture 64 and which slidably receives shaft 28 so that displacement of piston 80 causes corresponding associated displacement of the shaft 28 and, hence, of manipulator M.

Support 88 is secured to shaft 28 proximate the dorsal end thereof. Support 88 has an aperture 90 therethrough, as best shown in FIG. 2, and bushing 92 is disposed in the aperture 90. Bushing 92 has an aperture 94 coaxial with aperture 90 and through which the shaft 28 extends and, preferably, a bearing assembly is included within bushing 92 to permit rotation of shaft 28. Arms 96 and 98, as best shown in FIG. 3, extend forwardly from support 88 and are disposed substantially above the longitudinal axis of shaft 28. Keeper 100 is mounted, by welding or the like, to the upper surface of arms 96 and 98. Bolts 102 extend downwardly therefrom a substantial distance on either side of shaft 28. Dowel pin 104, as best shown in FIG. 2, extends radially outwardly from shaft 28 and is aligned with bolts 102. Rotation of shaft 28 on the longitudinal axis causes the dowel 104 to engage the bolts 102 upon a predetermined rotation being achieved. Consequently, the bolts 102 act as stops which prevent rotation of the shaft 28 beyond a predetermined angular amount. It should be obvious that one or more dowel pins 104 can be utilized so as to provide increased control over the rotation of shaft 28.

As best shown in FIG. 3, longitudinally extending arms 106 and 108 extend rearwardly from support 88 on either side thereof. The arms 106 and 108 are disposed in spaced parallel relation and each of the arms 106 and 108 has a recess, 110 and 112 respectively. The recesses 110 and 112 are aligned and piston 114 extends therebetween. Piston 114 is cylindrical and supports laterally displaceable cylinder 116. Preferably, cylinder 116 is air-powered and airlines 118 and 120 are connected therewith and to a control mechanism (not shown) in order to cause lateral displacement of the cylinder 116 on the piston 114.

Figure 4:
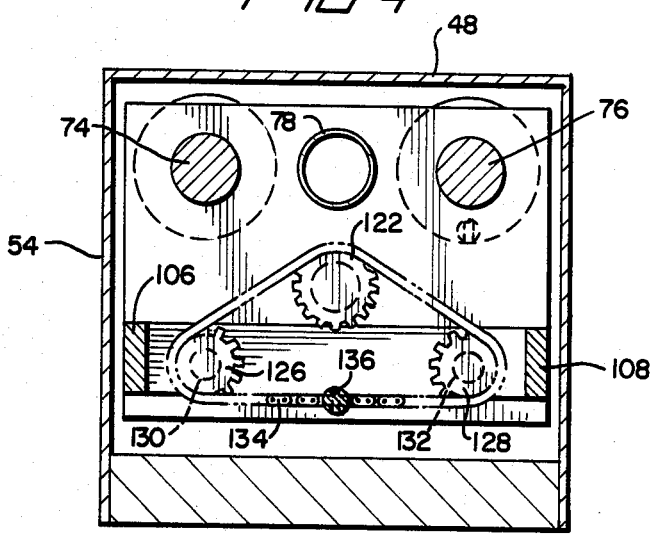
FIG. 4 is a cross-sectional view taken along the section 4—4 of FIG. 2 and viewed in the direction of the arrows.
Figure 5:
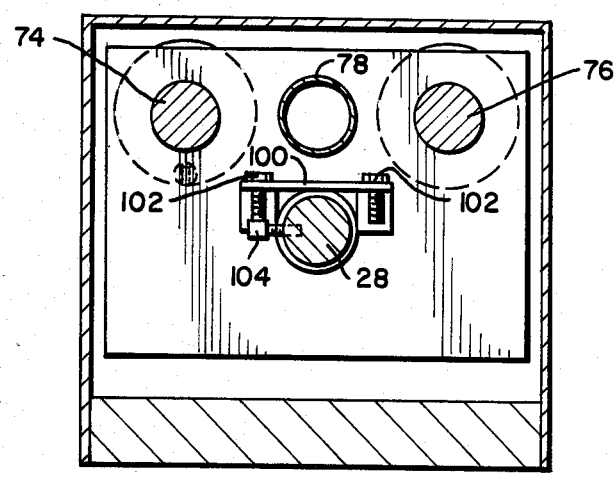
FIG. 5 is a cross-sectional view taken along the section 5—5 of FIG. 2 and viewed in the direction of the arrows; and, FIG. 6 is a cross-sectional view taken along the section 6—6 of FIG. 2 and viewed in the direction of the arrows.

As best shown in FIGS. 2, 3 and 4, toothed gear or sprocket 122 is secured to the dorsal end of shaft 28 and is disposed rearwardly of support 88 and bushing 92. The gear 122 is, preferably, coaxially secured to shaft 28. Idlers 126 and 128 are rotatably mounted to support 88 by means of stub shafts 130 and 132, respectively, as best shown in FIG. 4. Gear 122 and idlers 126 and 128 are free to rotate in a common plane. Chain 134 is trained about idlers 126 and 128 and gear 122 so that movement of the chain 134 causes corresponding associated rotation of the idlers 126 and 128 and the gear 122. Rotation of gear 122, by movement of chain 134, causes corresponding rotation of shaft 28 and, hence, of manipulator M.

Figure 6:
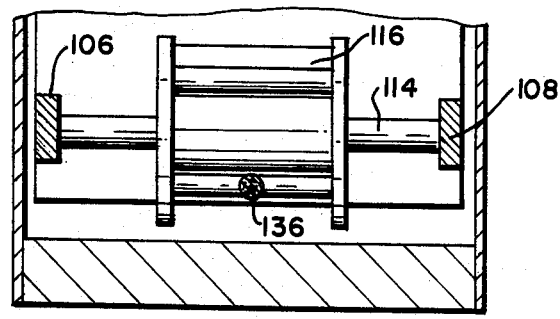

As best shown in FIGS. 2, 4 and 6, coupling link 136 extends longitudinally forwardly from cylinder 116 and is secured to chain 134 by a suitable connector, such as a bolt. In this way, the cylinder 116 is coupled with chain 134 so that lateral movement of cylinder 116 on shaft 114 causes corresponding movement of chain 134 and, therefore, rotation of manipulator M. Those skilled in the art will appreciate that bushing 92 and collar 84 preferably include bearings, such as the thrust bearings 138 of the collar 84, in order to facilitate rotation of shaft 28 on the longitudinal axis thereof. Preferably, a control mechanism (not shown) is housed in base 10 and is operably connected with cylinder 116 in order to control the lateral displacement thereof as a means for controlling rotation of the shaft 28. The stops provided by bolts 102 therefore provide a positive stop mechanism for the shaft 28.

As shown in phantom lines in FIG. 2, the support 88, and hence the rotation mechanism provided by cylinder 116, is movable with shaft 28 between stops 140 and 142 secured to braces 74 and 76. The stops 140 and 142 are adjustable on the braces 74 and 76 in order to provide a positive control for displacement of the shaft 28 by the piston 80. Additionally, the cylinder 78 of piston 80 is air-powered so that the support 88 may rest against the stops 140 and 142 without causing damage thereto so that a positive means for maintaining the manipulator M in a pre-determined position is provided.

Preferably, stops 140 and 142 include switches 144 and 146, respectively, which are connected with the control mechanism (not shown) in the base 10. The switches 144 and 146 are, preferably, proximity switches which sense the approach of support 88. Preferably, stops 140 and 142 have set screws 148 and 150, respectively, in order to permit longitudinal adjustment thereof on braces 74 and 76. Also, shock absorbers 152 and 154 extend from stops 140 and 142, respectively in order to slowdown movement of the piston 80. Consequently, a gradual slowdown is achieved rather than a sudden abrupt stop.

OPERATION

Operation and utilization of the rotation mechanism herein disclosed is relatively simple and straight forward due to the simplicity of design. Initially, the positions which the manipulator M must achieve are determined. The stops 140 and 142 are then set into the associated positions by means of set screws 150. In this way, longitudinal forward and rearward motion of the shaft 28 is controlled so that the manipulator M therefore achieves the pre-determined positions. Control of the rotation of shaft 28 may then be set by means of one or more dowel pins 104 and by the control mechanism (not shown) in the base 10. At this point, the arm 14, including the manipulator M, is ready for use.

Those skilled in the art will appreciate that rotation of shaft 28 on the longitudinal axis thereof can occur during longitudinal displacement of the shaft 28 because the support 88, and the rotation mechanism provided by the cylinder 116, are movable with the shaft 28. In this way, longitudinal and rotational movement of the shaft 28 may occur at the same time so that the speed at which the robot R may operate is greatly increased.

The rotation mechanism provided by support 88 and cylinder 116 is mounted to the dorsal end of shaft 28 in order to provide a counterweight effect permitting the load-carrying capability of manipulator M to be increased. The manipulator M, particularly when engaging a load, causes a torque to be applied to rotation mechanism 16 which must be resisted. Similarly, a torque is applied at the aperture 86. The rotation mechanism thereby balances, to a large degree, these torques because of its remote position relative to the manipulator M. The braces 74 and 76 also support the shaft 28 through support 88. The manipulator M can therefore achieve placement tolerances with relativelyheavy loads at levels not previously attainable.

While this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention of the limits of the appended claims.

What I claim is:

1. A rotary mechanism for robot manipulators and the like, comprising:
   (a) a housing;
   (b) shaft means having a longitudinal first axis movably associated with said housing and said shaft means including a first end portion exterior of said housing longitudinally movable on said first axis toward and away from said housing;
   (c) means for longitudinally moving said shaft means on said first axis;
   (d) manipulator means connected to said first end portion;
   (e) means for operating said manipulator means;
   (f) support means carried by said shaft means;
   (g) first drive means including rotary means rotatable on said first axis connected to said shaft means proximate said support means for rotating said shaft means on said first axis, and further including continuous linkage means trained about said rotary means and thereby rotating said shaft means upon movement of said linkage means;
   (h) second drive means including a driving portion movable linearly along a second axis generally transverse to said first axis and said second drive means carried by said support means and said driving portion operably engaged with said linkage means so that movement of said driving portion along said second axis causes associated rotation of said linkage means and thereby of said shaft means; and,
   (i) brace means associated with said housing and said support means for preventing rotation of said support means.

2. The mechanism as defined in claim 1, wherein:
   (a) said support means connected proximate a second end portion of said shaft means.

3. The mechanism as defined in claim 1, wherein:
   (a) said first drive rotation means including a rotary drive system.

4. The mechanism as defined in claim 1 wherein;
   (a) said first drive means including gear means being operatively associated with said shaft means proximate said support means; and,
   (b) said second drive means driving portion operatively engaged with said gear means for causing rotation of said gear means and thereby of said shaft means.

5. The mechanism as defined in claim 4, wherein:
   (a) idler means being rotatably mounted to said support means proximate said gear means;
   (b) said linkage means trained about said gear means and said idler means; and,
   (c) said driving portion engaged with said linkage means for causing movement of said linkage means and thereby rotation of said gear means.

6. The mechanism as defined in claim 5, wherein:
   (a) first and second spaced aligned leg members extending from said support means;
   (b) said second drive means further including piston means extending between said leg members;
   (c) a cylinder being movably disposed on said piston means for movement between said leg members; and,
   (d) coupling means extending from said cylinder and engaged with said linkage means so that movement of said cylinder causes associated movement of said linkage means and thereby rotation of said shaft means.

7. The mechanism as defined in claim 6, wherein:
   (a) said idler means including a first idler disposed adjacent a first side of said support means and a second idler disposed adjacent a second side of said support means;
   (b) said idlers being rotatable on parallel axes parallel to the axis of rotation of said gear means; and,
   (c) said linkage means including a chain.

8. The mechanism as defined in claim 1, wherein:
   (a) said brace means including a first brace generally parallel to said shaft means and adjacent a first side of said housing and a second brace generally parallel to said shaft means and adjacent a second side of said housing; and,
   (b) said support means being slidably engaged with each of said braces.

9. The mechanism as defined in claim 8, wherein:
   (a) said support means including a block having first and second apertures receiving said first and second braces.

10. The mechanism as defined in claim 1, wherein:
    (a) first and second longitudinally spaced stop means associated with said brace means and being engagable with said support means for stopping movement thereof.

11. The mechanism as defined in claim 1, wherein:

(a) said moving means including a cylinder and piston assembly positioned in said housing and being operatively engaged with said first end portion so that operation of said cylinder and piston assembly causes movement of said shaft means.

12. The mechanism as defined in claim 10, wherein:
(a) switch means being associated with said stop means and being operatively associated with said moving means for stopping movement of said shaft means after movement of a pre-selected distance.

13. The mechanism as defined in claim 8, wherein:
(a) said moving means and said braces being disposed in spaced parallel relation.

14. A rotary mechanism for robot manipulators and the like, comprising;
(a) a housing;
(b) shaft means having a longitudinal axis, longitudinally movably associated with said housing and said shaft means having a first end portion including manipulator means longitudinally movable toward and away from said housing;
(c) means for moving said first end portion;
(d) support means associated with said shaft means and being movable with said first end portion;
(e) gear means operatively associated with said shaft means for rotating at least said first end portion on said longitudinal axis thereof;
(f) continuous linkage means operatively engaged with said gear means for rotating said gear means and thereby rotating said first end portion upon movement of said linkage means;
(g) drive means including a driving portion movable linearly along an axis generally transverse to said shaft means engaged with said linkage means and said drive means carried by said support means for moving said linkage means and thereby causing rotation of said first end portion; and
(h) brace means engaged with said support means for preventing rotation of said support means during operation of said drive means.

15. The mechanism as defined in claim 14, wherein:
(a) idler means being rotably mounted to said support means proximate said gear means; and,
(b) said linkage means being trained about said idler means and said gear means for thereby permitting rotation of said linkage means.

16. The mechanism as defined in claim 15, wherein:
(a) said gear means being connected proximate a second end portion of said shaft means;
(b) said support means being engaged with said shaft means proximate said second end portion so that said gear means and said idler means rotate on a common plane; and,
(c) said idler means including a first idler proximate a first side of said housing and a second idler proximate a second side of said housing.

17. The mechanism as defined in claim 16, wherein:
(a) first and second spaced leg members extending from said support means, each of said leg members being associated with a side of said housing; and,
(b) said drive means mounted to said leg members.

18. The mechanism as defined in claim 17, wherein:
(a) a said drive means further including piston extending between said leg members;
(b) cylinder means being slidably mounted on said piston and being adapted for movement between said leg members; and, (c) said cylinder means being engaged with said linkage means so that movement of said cylinder means causes corresponding movement of said linkage means.

19. The mechanism as defined in claim 14, wherein:
(a) said brace means including a first brace generally parallel to said moving means and adjacent a first side of said housing and a second brace generally parallel to said moving means and adjacent a second side of said housing; and,
(b) said support means being slidably carried by said braces.

20. The mechanism as defined in claim 19, wherein:
(a) said moving means including a cylinder and piston assembly having the cylinder thereof secured to said housing and the piston thereof secured to said first end portion so that displacement of the piston causes associated movement of said first end portion; and,
(b) said braces and said cylinder and piston assembly being disposed in spaced parallel relation.

21. The mechanism as defined in claim 14, wherein:
(a) stop means being associated with said brace means for preventing movement of said support means.

22. The mechanism as defined in claim 14, wherein:
(a) said shaft means including a shaft having said manipulator means mounted to a first end thereof and said support means being mounted proximate a second end thereof.

23. A rotary mechanism for robot manipulators and the like, comprising:
(a) a housing;
(b) shaft means having a longitudinal axis, longitudinally movably associated with said housing so that a first end portion thereof is longitudinally movable along said axis toward and away from said housing;
(c) means for longitudinally moving said shaft means along said axis;
(d) manipulator means connected to said first end portion;
(e) reans for operating said manipulator means;
(f) support means connected to said shaft means at a distance from said first end portion;
(g) means carried by said support means and operatively associated with said shaft means for rotating said shaft means on the longitudinal axis thereof;
(h) brace means associated with said housing and engaged with said support means for preventing rotation of said support means during operation of said rotating means;
(i) gear means operatively associated with said shaft means proximate said support means;
(j) said rotation means including rotary drive means operatively engaged with said gear means for causing rotation of said gear means and thereby of said shaft means;
(k) idler means being rotatably mounted to said support means proximate said gear means;
(l) continuous linkage means trained about said gear means and said idler means;
(m) drive means engaged with said linkage means for causing movement of said linkage means and thereby rotation of said gear means;
(n) first and second spaced aligned leg members extending from said support means;
(o) said rotating means further including piston means extending between said leg member;

(P) a cylinder movably disposed on said piston means for movement between said leg members; and, (q) coupling means extending from said cylinder and engaged with said linkage means so that movement of said cylinder causes associated movement of said linkage means and thereby rotation of said shaft means.

24. The mechanism as defined in claim 23, wherein:

(a) said brace means including a first brace extending generally parallel to said shaft means and adjacent a first side of said housing and a second brace extending generally parallel to said shaft means and adjacent the second side of said housing;

(b) said support means including a block having first and second apertures through which said first and second braces extend; and, (c) said support means being slideably mounted to said braces.

* * * * *